(12) United States Patent
Clark et al.

(10) Patent No.: US 11,755,200 B2
(45) Date of Patent: *Sep. 12, 2023

(54) ADJUSTING OPERATING SYSTEM POSTURE FOR A TOUCH-ENABLED COMPUTING DEVICE BASED ON USER INPUT MODALITY SIGNALS

(71) Applicant: MICROSOFT TECHNOLOGY LICENSING, LLC, Redmond, WA (US)

(72) Inventors: Lee Dicks Clark, Redmond, WA (US); Richard Fang, Bellevue, WA (US); Alisha Dilip Gala, Belevue, WA (US); Merryjane M. Fosdick, Kirkland, WA (US); Aaron R. Teetor, Bellevue, WA (US); Michael Neil Loholt, Seattle, WA (US); Leo Tian Yue, Seattle, WA (US); Albert Peter Yih, Seattle, WA (US); Joseph Spencer King, Seattle, WA (US); Elizabeth Picchietti Salowitz, Redmond, WA (US); Hanna Mclaughlin, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/752,846

(22) Filed: May 24, 2022

(65) Prior Publication Data

US 2022/0398010 A1 Dec. 15, 2022

Related U.S. Application Data

(63) Continuation of application No. 17/014,942, filed on Sep. 8, 2020, now Pat. No. 11,372,541.

(51) Int. Cl.
 *G06F 3/048* (2013.01)
 *G06F 3/04886* (2022.01)
 (Continued)

(52) U.S. Cl.
 CPC ........ *G06F 3/04886* (2013.01); *G06F 1/1647* (2013.01); *G06F 1/1654* (2013.01);
 (Continued)

(58) Field of Classification Search
 CPC .... G06F 3/04886; G06F 9/452; G06F 1/1654; G06F 3/03545; G06F 3/04817; G06F 3/1454
 See application file for complete search history.

(56) References Cited

U.S. PATENT DOCUMENTS

| | | | |
|---|---|---|---|
| 2018/0330694 A1* | 11/2018 | Klein | G06F 9/4401 |
| 2020/0183506 A1* | 6/2020 | Tamura | G06F 3/0414 |

* cited by examiner

*Primary Examiner* — Rashawn N Tillery
(74) *Attorney, Agent, or Firm* — Newport IP, LLC; Jacob P. Rohwer

(57) ABSTRACT

Techniques for adjusting a posture of an operating system mode for a touch-enabled computing device based on combinations of user preferences and user input modality signals. Various adjustments to the posture of the operating system mode do not impact whether particular user interface elements are present but rather alter characteristics with which these particular user interface elements are rendered. Posture adjustments to an operating system mode occur based on combinations user input modality signals and user preferences not to enter another mode in which particular user interface elements are no longer displayed within a task bar along a peripheral edge. An object of designing an operating system mode to have multiple different postures with common user interface elements displayed in the task bar while adjusting the characteristics thereof is to preserve (Continued)

the user familiarity across postures while optimizing graphical layouts to accommodate for a current user input modality.

20 Claims, 8 Drawing Sheets

(51) Int. Cl.
    *G06F 3/04817*     (2022.01)
    *G06F 3/0354*     (2013.01)
    *G06F 1/16*     (2006.01)
    *G06F 9/451*     (2018.01)
    *G06F 3/14*     (2006.01)

(52) U.S. Cl.
    CPC ...... *G06F 3/03545* (2013.01); *G06F 3/04817* (2013.01); *G06F 3/1454* (2013.01); *G06F 9/452* (2018.02)

ADJUSTING OPERATING SYSTEM POSTURE FOR A TOUCH-ENABLED COMPUTING DEVICE BASED ON USER INPUT MODALITY SIGNALS

CROSS-REFERENCE TO RELATED APPLICATION

This application is a continuation of U.S. patent application Ser. No. 17/014,942 filed Sep. 8, 2020, entitled "ADJUSTING OPERATING SYSTEM POSTURE FOR A TOUCH-ENABLED COMPUTING DEVICE BASED ON USER INPUT MODALITY SIGNALS", which is hereby incorporated herein in its entirety.

BACKGROUND

A variety of touch-enabled computing devices are configured to operate in two highly discrete modes with drastically different graphical user interfaces depending on a current modality of user input. In particular, at times when a peripheral-type keyboard user input device is attached, some touch-enabled computing devices by default operate in a desktop mode having a graphical user interface with a task bar located along a perimeter edge (e.g., the bottom) and comprised of relatively small icons that individually represent operating system functionalities and currently executing applications. Then, in response to the keyboard being detached, such touch-enabled devices automatically switch to a tablet mode having a graphical user interface that is very different in the sense that one or more of these small icons that were previously located around the perimeter edge within the task bar are absent and replaced with relatively larger tile type icons that are displayed in a centrally located grid arrangement. Accordingly, the two different modes include completely different user interface elements and require drastically different interaction patterns to invoke similar actions.

A major drawback of toggling a touch-enabled computing device between highly discrete modes with very different graphical user interfaces is that correlations between how to invoke similar or identical functions may be highly nonintuitive between modes. For example, suppose that a user is actively toggling between using two applications while in desktop mode by clicking icons that represent these two applications in the task bar. Then, the user may detach the keyboard with the intention of continuing to switch between the two applications. However, to the user's dismay, removal of the keyboard may trigger the device to operate in the tablet mode in which the icons representing the applications are absent from the task bar and the interaction patterns which cause the device to switch between the two applications are drastically different than they previously were in the desktop mode that the user was accustomed to. Accordingly, in order to continue switching between using the applications the user must learn and utilize a completely different manner of interacting with the touch-enabled computing device.

In scenarios in which the user is knowledgeable of how to perform desired tasks (e.g., switching between applications) in each discrete mode, having to consciously make significant adjustments to current user interactions patterns when slight user input modality changes occur can be highly disruptive. Even worse, in scenarios in which the user is knowledgeable of how to perform desired tasks in only a preferred one of the discrete modes, even a slight change in user input modality (e.g., detachment of a keyboard) may severely hamper the user's productivity. For this reason, many users define system preferences to prevent a touch-enabled computing device from toggling from the familiar desktop mode into the tablet mode notwithstanding various changes to a current user input modality.

It is with respect to these considerations and others that the disclosure made herein is presented.

SUMMARY

This disclosure describes systems and techniques for adjusting a posture of an operating system mode for a touch-enabled computing device based on combinations of user preferences and user input modality signals. Generally described, various adjustments to the posture of the operating system mode do not impact whether particular user interface elements are present but rather alter characteristics with which these particular user interface elements are rendered on the touch-enabled computing device, interacted with on the touch-enabled computing device, or both. In some implementations, posture adjustments in which characteristics of the particular user interface elements are altered may occur in response to combinations of changes to user input modality signals and user preferences indicating a user preference not to enter a specific mode (e.g., a "tablet mode") in which the particular user interface elements are no longer displayed within a task bar along a peripheral edge. An object of designing an operating system mode to have multiple different postures with common user interface elements displayed in a task bar along a peripheral edge while adjusting the characteristics thereof is to preserve the user familiarity across postures while optimizing graphical layouts (e.g., spacing between user interface elements) and/or interaction patterns to accommodate for a current user input modality. In this way, the particular user interface elements that users are already accustomed to selecting (or otherwise interacting with) to invoke certain functionalities remain available across different postures of an operating system mode (e.g., different postures of a "desktop" mode). At the same time, certain characteristics of these particular user interface elements are optimally adjusted to accommodate the current manner in which a user can potentially interact with those user interface elements (e.g., touchpad input if a peripheral keyboard is attached vs. touch-screen input if the peripheral keyboard is detached).

In one embodiment, a touch-enabled computing device executes an operating system that is configured to operate in accordance with at least two different modes based on user preference data. For example, the user preference data may indicate particular circumstances in which the operating system is to operate in accordance with a first mode (e.g., a "desktop mode") having a graphical user interface (GUI) that includes a task bar located along a perimeter edge (e.g., the bottom) of a display area. The task bar may be comprised of OS function icons (e.g., user interface elements that represent certain operating system functionalities) and application icons (e.g., user interface elements that represent currently executing applications). An exemplary OS function icon may be an OS search icon that is selectable to call upon an OS Search functionality for searching through local directories and/or web-based resources based on a user-defined search string. An exemplary application icon may be a web browser icon that is selectable to bring forward (or otherwise expose) a browser application window for a web browser application that is open on the touch-enabled computing device.

Here, under circumstances in which the user preference data indicates a user preference to have the operating system toggle into the second mode in response to the predefined user input modality signals, then the touch-enable computing device may monitor various data sources to determine when such predefined user input modality signals occur. Then, in response to an occurrent of such predefined user input modality signals, the operating system may toggle into the second mode. For example, based on the user preference data, the operating system may respond to a peripheral keyboard being detached from the touch-enabled computing device by immediately and automatically switching into the tablet mode.

In contrast, if the user preference data instead indicates a user preference that the operating system does not toggle into the second mode even when such predefined user input modality signals are detected (e.g., even if a keyboard is detached as described above), then detection of the predefined user input modality signals may cause the operating system to adjust a posture of the first mode having the task bar that is located along the perimeter edge of the display area and that includes the user interface elements that represent the operating system functionalities in addition to the currently executing applications. Here, the user input modality signals may indicate that user inputs are more likely to be received via a touchscreen than a touchpad. For example, the user input modality signals may correspond to a keyboard device becoming detached and/or accelerometer data indicating that the touch-enabled computing device is being held in a manner that is not optimal for keyboard usage. Then, in response to the detected user input modality signals, the touch-enabled computing device may automatically adjust the posture of the first mode in a manner such that the OS function icons and application icons continue to be rendered within the task bar along the peripheral edge but are linearly spaced farther apart within the task bar to improve touchscreen based interactions with the touch-enabled computing device.

In this example, operation of the touch-enabled device remains intuitive in the sense that a user can still cause the operating system to invoke particular functions by selecting the same user interface elements which were present in the task bar prior to the peripheral user input device becoming unavailable. At the same time, the increased linear spacing between these user interface elements improves an ability for individual ones of these user interface elements to be selected via a touch screen (e.g., a capacitive sensing display). For example, since a curser element is no longer being rendered to indicate precisely which user interface element is being hovered over prior to a user clicking a button to complete the selection, the increased spacing reduces the probability of the user inadvertently selecting an icon that is adjacent to an intended or targeted icon.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-executable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The following Detailed Description describes techniques for adjusting a posture of an operating system mode for a touch-enabled computing device based on combinations of user preferences and user input modality signals. Various adjustments to the posture of the operating system mode do not impact whether particular user interface elements are present but rather alter characteristics with which these particular user interface elements are rendered and/or interacted with on the touch-enabled computing device. Posture adjustments to an operating system mode (e.g., a "desktop mode") may occur based on combinations user input modality signals and user preferences not to enter another mode (e.g., a "tablet mode") in which particular user interface elements are no longer displayed within a task bar along a peripheral edge. An object of designing an operating system mode to have multiple different postures with common user interface elements displayed in a task bar along a peripheral edge while adjusting the characteristics thereof is to preserve the user familiarity across postures while optimizing graphical layouts and/or interaction patterns to accommodate for a current user input modality. In this way, the particular user interface elements that users are already accustomed to selecting to invoke certain functionalities remain available across different postures of an operating system mode (e.g., different postures of a "desktop" mode). At the same time, certain characteristics of these particular user interface elements are optimally adjusted to accommodate the current manner in which a user can potentially interact with those user interface elements.

Figure 1:
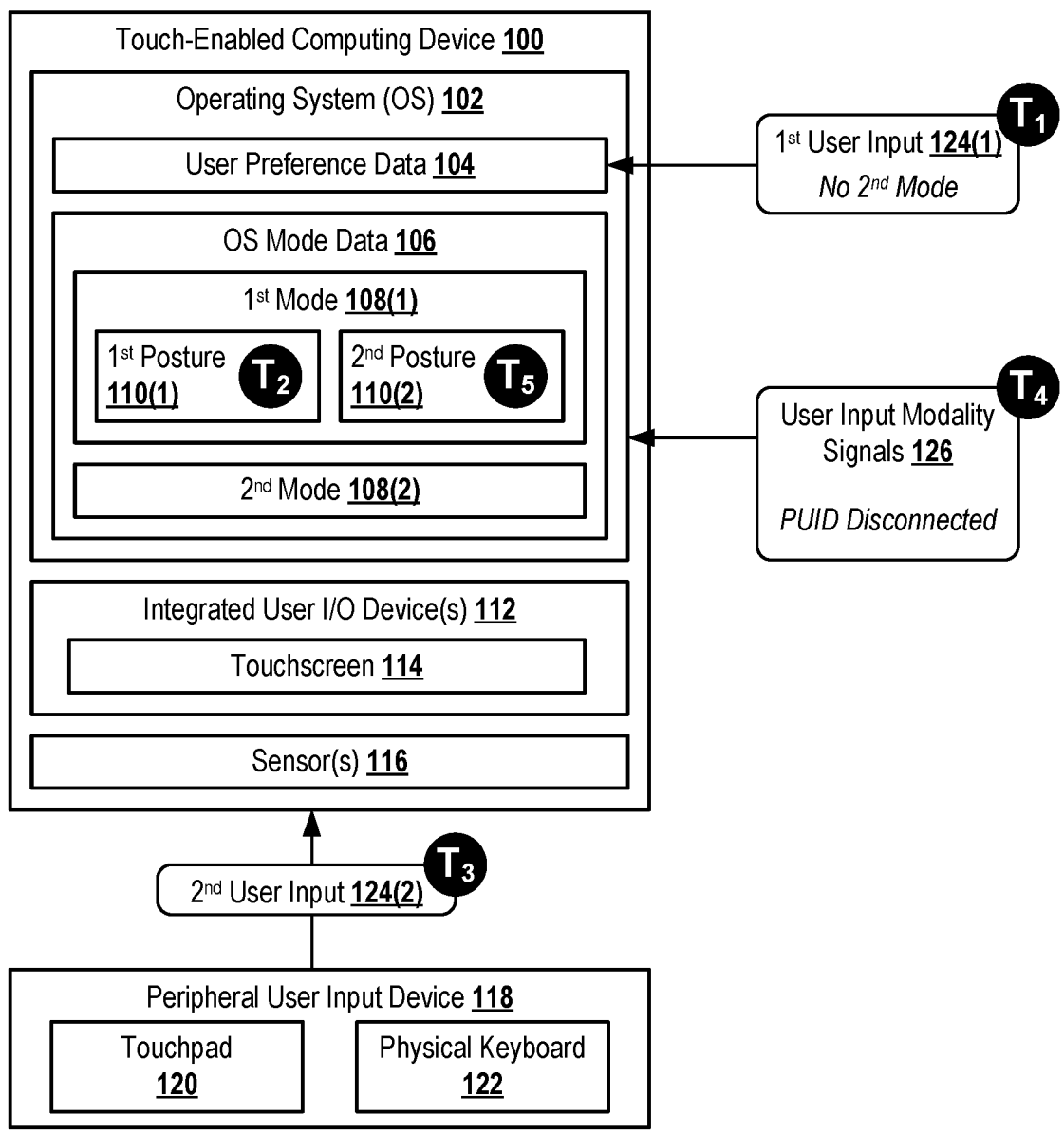
FIG. 1 illustrates an exemplary scenario for a touch-enabled computing device to adjust a posture of a first operating system mode based on combinations of user preferences and user input modality signals.

FIG. 1 illustrates an exemplary scenario for a touch-enabled computing device 100 to adjust a posture of a first operating system mode for a touch-enabled computing device based on combinations of user preferences and user input modality signals. The technologies disclosed herein with respect to the system 100 provide improvements over existing touch-enabled computing devices which lack an ability to automatically adjust the posture of individual operating system modes by altering characteristics with which common user interface elements are rendered (e.g., spaced within a task bar) to accommodate for a current user input modality. For example, as described above, existing touch-enabled computing devices respond to certain trigger events (e.g., a user removing a peripheral keyboard) by toggling between highly discrete modes with very different graphical user interfaces. A drawback of such implementations is that correlations between how to invoke similar or identical functions may be highly non-intuitive between the drastically different operating system modes. For example, user interaction patterns for invoking certain functions and/or tasks within a desktop mode may bear little resemblance to other user interaction patterns for invoking these same functions within a tablet mode. Accordingly, toggling between drastically different operating system modes may disrupt productivity since a user may need to consciously adjust how they are interacting with a device or, even worse, the user may not even understand how to perform certain desired tasks after the device switches into some particular mode. In contrast, the techniques described herein facilitate relatively subtle posture changes to occur within a single operating system mode to accommodate for a currently relevant user input modality.

As illustrated in FIG. 1, the touch-enabled computing device 100 may utilize hardware (e.g., processors, memory, etc.) to execute an operating system 102 that performs one or more of the various operations described herein and/or to store various types of data described herein. In the illustrated embodiment, the operating system 102 includes user preference data 104 indicating various user preferences associated with the operation of the touch-enabled computing device 100 and OS mode data 106 defining various operational modes in which the operating system 102 can execute on the touch-enabled computing device 100. Exemplary user preferences which can be defined within the user preference data 104 include, but are not limited to, a user defined name of the touch-enabled computing device (e.g., "Bob's Surface Pro"), startup options that prescribe which applications run automatically upon the touch-enabled computing device 100 being booted up, and OS Mode preferences indicating if and when the operating system 102 is to toggle between different operational modes. Exemplary operational modes which can be defined within the OS Mode data 106 include, but are not limited to, a first mode 108(1) having a graphical user interface (GUI) that includes a task bar located along a perimeter edge (e.g., the bottom) of a display area, and a second mode 108(2) having an alternative GUI and/or alternative user interaction patterns for invoking certain tasks.

For purposes of the present discussion of FIG. 1, presume that the first mode 108(1) corresponds to a "desktop mode" in which a task bar located along a peripheral edge of an available display area is comprised of OS function icons (e.g., user interface elements that represent certain operating system functionalities) and application icons (e.g., user interface elements that represent currently executing applications). An exemplary OS function icon may be an OS search icon that is selectable to call upon an OS Search functionality for searching through local directories and/or web-based resources based on a user-defined search string. An exemplary application icon may be a web browser icon that is selectable to bring forward (or otherwise expose) a browser application window for a web browser application that is open on the touch-enabled computing device. Further presume that the second mode 108(2) corresponds to a "tablet mode" in which one or more application icons which were previously displayed within the task bar are omitted from the task bar and replaced with relatively larger tile icons that are centrally located within the display area in a grid arrangement. For example, in a "tablet mode" the task bar may include only the OS function icons but may omit the application icons which may instead be enlarged into tile form and centrally located within the display area.

As used herein, the term "mode" may be used to refer to a computing mode in which a predefined set of user interface elements are rendered within a predefined graphical region of an available display area. For example, a "desktop" mode may refer to a particular computing mode in which a predefined graphical region is a taskbar that is rendered along a peripheral edge of an available display area and which includes a predefined set of OS functionality icons in addition to one or more application icons (if applications are currently executing on a computing device). As used herein, the term "posture" may be used to refer to a particular graphical configuration of a particular mode. For example, a single computing "mode" may include two or more postures that define various manners and/or characteristics of graphically rendering a predefined set of user interface elements within a predefined graphical region of an available display area. As a specific but non-limiting example, if a particular computing mode corresponds to a predefined set of user interface elements being rendered within a task bar that is rendered along a peripheral edge of a display area, then various postures of the particular computing mode may correspond to different linear spacings between adjacent ones of the predefined set of user interface elements.

As illustrated, one or more integrated user input/output (I/O) devices 112 are installed within the touch-enabled computing device 100. Integrated user I/O device(s) 112 include at least a touchscreen 114 which serves as both an output device through which user interface elements (and other information) are displayed and an input device through which a user can interact with the displayed user interface elements by touching the touchscreen 114 with her fingers and/or a stylus. In particular, the touchscreen 114 is an input device configured to detect the presence and location of a touch. The touchscreen 114 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some embodiments, the touchscreen 114 is incorporated on top of a display (e.g., an OLED display) as a transparent layer to enable a user to use one or more touches to interact with objects or other information presented on the display.

In some configurations, the touchscreen 114 is a single-touch touchscreen. In other configurations, the touchscreen 114 is a multi-touch touchscreen. In some configurations, the touchscreen 114 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 114. As such, a developer can create gestures that are specific to a particular application program.

Additionally, the touch-enabled computing device 100 includes one or more sensor(s) 116. Exemplary sensors 116 include, but are not limited to, a proximity sensor that is configured to detect the presence of an object or thing in proximity to the touch-enabled computing device 100 without direct contact, an accelerometer that is configured to measure proper acceleration, and/or a gyroscope that is configured to measure and maintain orientation. In some configurations, output from one or more of the proximity sensor, accelerometer, or gyroscope is used by the operating system 102 as an input mechanism to determine an appropriate mode 108 and/or posture 110 thereof to operate in accordance with.

As shown in FIG. 1, the touch-enabled computing device 100 may be communicatively coupled to and de-coupled from a peripheral user input device 118. An exemplary such peripheral user input device 118 may magnetically couple to the touch-enabled computing device 100 and may include both of a touchpad 120 and a physical keyboard 122. Furthermore, the touch-enabled computing device 100 may be configured to determine a current availability status of the peripheral user input device 118. For example, the touch-enabled computing device 100 may be configured to continually monitor whether the peripheral user input device 118 is available for the user to provide user input to the touch-enabled computing device 100.

Aspects of the exemplary scenario for the touch-enabled computing device 100 to adjust the posture 110 of the first operating system mode 108(1) in FIG. 1 are described with respect to a first time $T_1$ through a fifth time $T_5$. For purposes of the present discussion, these times represent a sequence of times in which: $T_1 < T_2 < T_3 < T_4 < T_5$ (where < means "prior to").

As illustrated, at a first time $T_1$, first user input 124(1) is provided to modify the user preference data 104 to indicate a user preference that the operating system 102 does not toggle into the second mode 108(8) notwithstanding the occurrence of some predefined trigger event. For purposes of the present scenario, presume that the predefined trigger event corresponds to the peripheral user input device 118 being disconnected from the touch-enabled computing device 100. This relatively simple trigger event is utilized for exemplary purposes only and it will be appreciated from the following discussion that in various embodiments combinations of multiple different user input modality signals may be used to serve as the trigger event.

At time $T_2$, the touch-enabled computing device 100 operates in accordance with a first posture 110(1) of the first mode 108(1) in which a task bar is located along a peripheral edge of an available display area is comprised of OS function icons (e.g., user interface elements that represent certain operating system functionalities) and application icons (e.g., user interface elements that represent currently executing applications). Here, the touch-enabled computing device 100 may be operating in the first posture 110(1) of the first mode 108(1) (e.g., the "desktop mode") responsive to a determination that the predefined trigger event (e.g., which the user has indicated should not result in/trigger operation in the second mode 108(2)) has not occurred. For example, based on the current presumption that the predefined trigger event corresponds to the peripheral user input device 118 being disconnected from the touch-enabled computing device 100, at time $T_2$ the touch-enable computing device 100 operates in accordance with the first posture 110(1) of the first mode 108(1) due to the peripheral user input device 118 being connected to the touch-enabled computing device 100 at time $T_2$.

At time $T_3$, second user input 124(2) is being provided to the touch-enabled computing device 100 by way of the peripheral user input device 118. For example, a user may be performing finger gestures on the touchpad 120 and/or may be typing by pressing physical keys of the physical keyboard 122.

Then, at time $T_4$, the operating system 102 receives user input modality signals 126 indicating that the peripheral user input device (PUID) 118 has been disconnected from the touch-enabled computing device 100. As described above, the user preference data 104 indicates a user preference not to switch the operating system 102 from the first mode 108(1) into the second mode 108(2).

Accordingly, at time $T_5$, the touch-enabled computing device 100 responds to the combination of the user input modality signals 126 indicating that the predefined trigger event has occurred and the user preference data 104 indicating that the predefined trigger event is not to cause the operating system 102 to toggle operation into the second mode 108(2) (e.g., the "tablet mode") by adjusting the first mode 108(1) from the first posture 110(1) to a second posture 110(2) which retains common user interface elements (also referred to herein as "icons") within the task bar that is located along the perimeter edge of the display area but that adjust a linear spacing between the icons within the task bar. For example, in response to detecting the user input modality signals 126 indicating that the PUID 118 has been disconnected and the user preference data 104 precluding such user input modality signals 126 from triggering operation of the operating system 102 in the second mode 108(2), the touch-enabled computing device 100 may automatically adjust the posture of the first mode 108(1) in a manner such that the OS function icons and application icons continue to be rendered within the task bar along the peripheral edge but are linearly spaced farther apart within the task bar to better facilitate interactions with the touch-enabled computing device 100 via the touchscreen 114.

In some embodiments, the predefined trigger event may correspond to a touchscreen usage exceeding a threshold usage level. For example, the touch-enabled computing device 100 may monitor both user input received by way of the touchscreen 114 and/or user input received by way of the touchpad 120. Then, based on the ratio of first user inputs received by way of the touchscreen 114 to second user inputs received by way of the touchpad 120 exceeding a threshold, the touch-enabled computing device 100 may determine that the trigger event has occurred. As a specific but non-limiting example, if over a predetermined time interval (e.g., the last five minutes, or any other suitable time interval) eighty percent or more of all user input to the touch-enabled computing device is received via the touchscreen 114 and twenty percent or less is received via the touchpad 120, then the touch-enabled computing device may determine that the predefined trigger event has occurred.

Turning now to FIG. 2A through FIG. 2D, example scenarios are illustrated in which the touch-enabled computing device 100 operates in accordance with various different postures 110 of various operating system modes 108 based on combinations of user input modality signals and user preferences. It should be appreciated that various aspects described in relation to one or more of FIG. 2A through FIG. 2D may be omitted from the example scenarios with which those aspects are described in relation to and/or combined with aspects of other example scenarios. Furthermore, the limited number of example scenarios described herein are for illustrative purposes only and are not to be construed as limiting. Performance of various aspects of the techniques described herein are contemplated under many other factual scenarios.

Figure 2A:
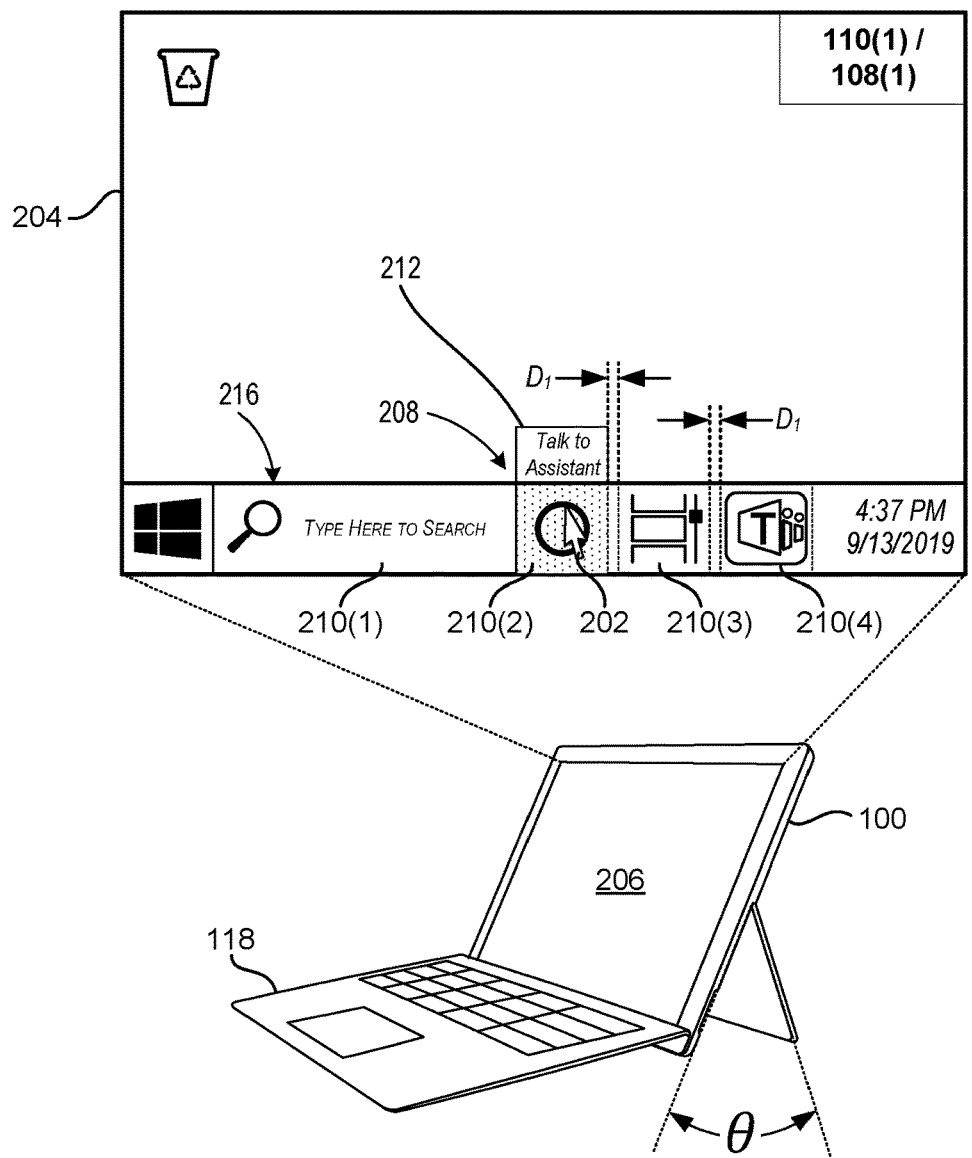
FIG. 2A illustrates a scenario in which the touch-enabled computing device is operating in accordance with a first posture of the first operating system mode.

FIG. 2A illustrates a scenario in which the touch-enabled computing device 100 is operating in accordance with the first posture 110(1) of the first mode 108(1). As illustrated in scenario A, the touch-enabled computing device 100 has detected user input modality signals 126 that include a combination of the peripheral user input device 118 being currently connected to the touch-enabled computing device 100 in addition a kickstand angle (represented by the "θ" symbol) being greater than a threshold angle.

For purposes of the present discussion, presume that in terms of design parameters the user input modality signals 126 shown in FIG. 2A are considered to be indicative that the peripheral user input device 118 will be the currently preferred channel (e.g., mode) for providing user input. Further suppose that responsive to receiving user inputs via the touchpad 120 of the peripheral user input device 118, the operating system causes a curser 202 to move around a display area 204 of a display screen 206. In the illustrated embodiment, while operating in the first posture 110(1) of the first mode 108(1), a hovering graphical effect 208 may be rendered in relation to a particular user interface element 210 on which the curser 202 is currently placed over. For example, as illustrated, the curser 202 is currently placed over a second user interface element 210(2) that is selectable to invoke a "Talk to Assistance" OS functionality. The hovering graphical effect 208 may include adjusting a background color of the particular user interface element 210 (e.g., to provide contrast to distinguish the particular user interface element 210 from other user interface elements which the curser 202 is not currently placed over). Additionally, or alternatively, the hovering graphical effect 208 may include exposing a written description 212 of the OS functionality and/or application to which the particular user interface element 210 corresponds. As illustrated, for example, the curser 202 being currently placed over the second user interface element 210(2) causes the words "Talk to Assistant" to be exposed adjacent to (e.g., directly above) the second user interface element 210(2) to inform a user of the OS functionality which can be invoked by selecting the second user interface element 210(2).

As illustrated, the first mode 108(1) in which the operating system 102 may operate corresponds to a "desktop mode" having a graphical user interface (GUI) that includes a task bar 216 located along a perimeter edge (e.g., the bottom) of the display area 204. The task bar 216 may include a plurality of OS function icons (e.g., user interface elements that represent certain operating system functionalities) and/or application icons (e.g., user interface elements that represent currently executing applications). An exemplary OS function icon may be an OS search icon that is selectable to call upon an OS Search functionality for searching through local directories and/or web-based resources based on a user-defined search string. An exemplary application icon may be a Team Collaboration application icon that is selectable to bring forward (or otherwise expose) a Team Collaboration window for a Team Collaboration application that is open on the touch-enabled computing device 100. In the illustrated example, the first user interface element 210(1) through the third user interface element 210(3) are representative of OS function icons whereas the fourth user interface element 210(4) is a representative application icon.

As further illustrated, while operating in accordance with the first posture 110(1) of the first mode 108(1), the user interface elements 210 are rendered with a first spacing therebetween. Specifically, the first posture 110(1) prescribes that the linear Distance $D_1$ be provided in between the user interface elements 210 within the task bar 216. Furthermore, while operating in the first posture 110(1) of the first mode 108(1), an OS Search icon (which corresponds to the first user interface element 210(1)) includes an exposed user input field into which a user can enter a search string in association with the OS search functionality.

Figure 2B:
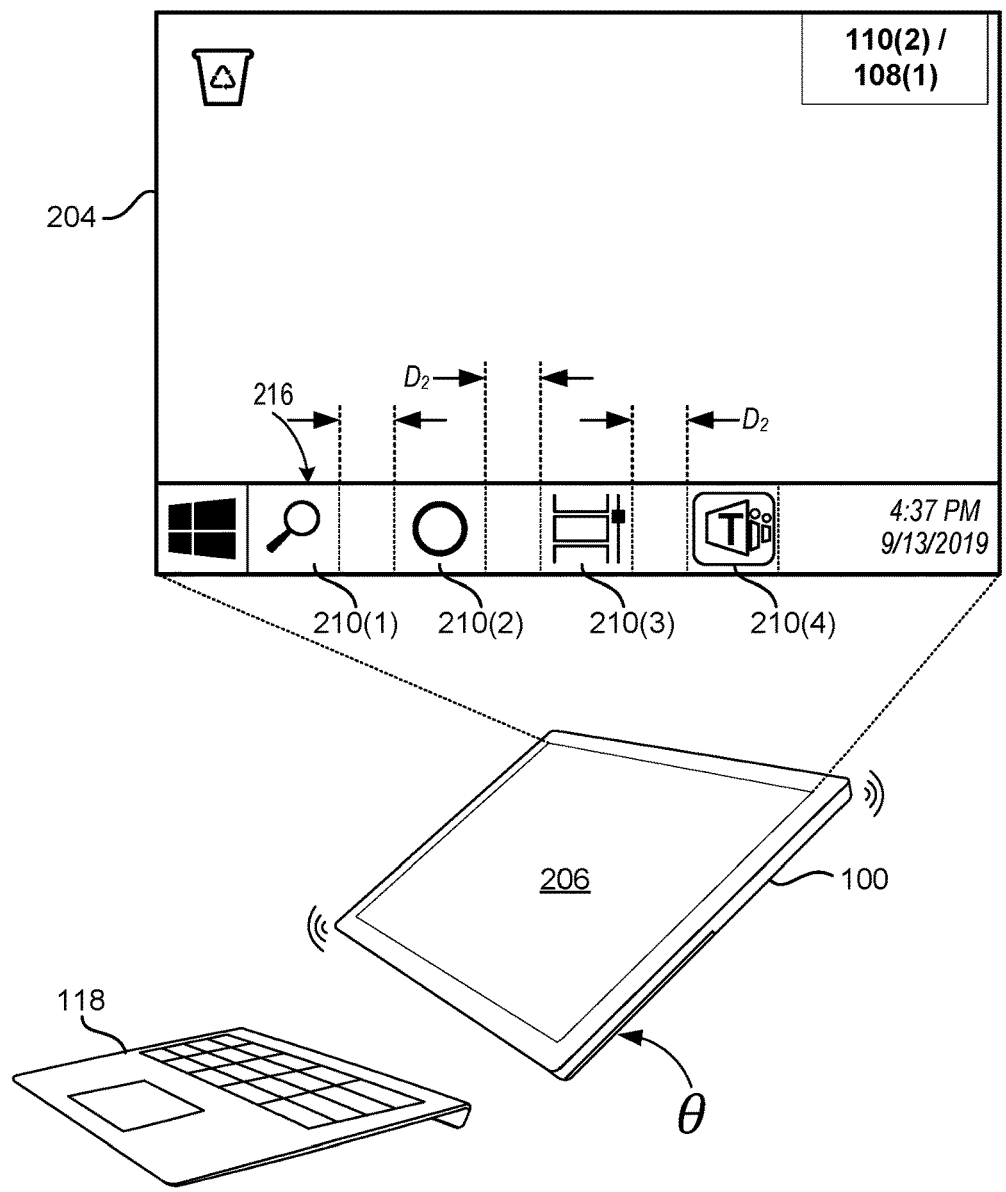
FIG. 2B illustrates a scenario in which the touch-enabled computing device has transitioned to operating in accordance with a second posture of the first operating system mode.

FIG. 2B illustrates a scenario in which the touch-enabled computing device 100 is operating in accordance with the second posture 110(2) of the first mode 108(1) (e.g., the "desktop" mode in which the task bar 216 is rendered along a peripheral edge of the display area 204 and in which the task bar 216 includes the user interface elements 210 that are commonly shared with the first posture 110(1)). As illustrated in scenario B, the touch-enabled computing device 100 has detected user input modality signals 126 that include a combination of the peripheral user input device 118 being currently disconnected from the touch-enabled computing device 100, the kickstand angle being less than the threshold angle, and accelerometer data being consistent with the device 100 being held (e.g., the device 100 may be subject to some degree of shaking or other motion which indicates it is not resting on a stable surface such as a table of desk).

For purposes of the present discussion, presume that in terms of design parameters the user input modality signals 126 shown in FIG. 2B are considered to be indicative that the touchscreen 114 will be the currently preferred channel (e.g., mode) for providing user input. For example, while operating in accordance with the first posture 110(1), the touch-enabled computing device 100 may receive user input modality signals 126 indicating that a most likely user input modality has changed from a first input modality to a second input modality. For example, the user input modality signals may indicate that inputs are more likely to be received via the touchscreen 114 than the touchpad 120, or vice versa. Exemplary such user input modality signals 126 may include a combination of a keyboard device becoming detached or otherwise unavailable (e.g., accelerometer data indicating that the touch-enabled computing device is being held in a manner that is not optimal for keyboard usage).

For purposes of the present discussion, presume that the change to the user input modality signals 126 between scenarios A and B has resulted in a posture adjustment from the first posture 110(1) shown in FIG. 2A to the second posture 110(2) shown in FIG. 2B. As can be appreciated from a comparison of FIGS. 2A to 2B, the posture adjustment from the first to second posture may include collapsing a particular user interface element 210(1) of the task bar 216 and increasing a linear spacing between the plurality user interface elements 210 within the task bar. For example, as shown in FIG. 2B, the user input field into which a user can enter a search string in association with the OS search functionality has been collapsed or hidden so that the first user interface element 210(1) takes up less horizontal space within the task bar 216. Collapsing or otherwise reducing the horizontal space taken up by the first user interface element 210(1) allows for an increased linear spacing between the user interface elements 210 that represent the represent available operating system functions and/or currently running applications. For example, as illustrated, while operating in accordance with the second posture 110(2) of the first mode 108(1), the user interface elements 210 are rendered with a second spacing therebetween. Specifically, the second posture 110(2) prescribes that the linear Distance $D_2$ be provided in between the user interface elements 210 within the task bar 216, where the linear Distance $D_2$ is greater than the linear Distance $D_1$.

As opposed to having the user input modality signals 126 of scenario B cause the device 100 to enter a tablet mode in which various user interface elements 210 are no longer rendered in the task bar, an object of designing the first operating system mode 108(1) to have multiple different postures with common user interface elements displayed in the task bar 216 along a peripheral edge while adjusting the characteristics thereof is to preserve the user familiarity across postures 110 while optimizing graphical layouts (e.g., spacing between user interface elements 210) and/or interaction patterns to accommodate for a current user input modality. In this way, the particular user interface elements 210 that users are already accustomed to selecting (or otherwise interacting with) to invoke certain functionalities remain available across different postures 110 of an operating system mode 108 (e.g., different postures of a "desktop" mode). At the same time, certain characteristics of these particular user interface elements 210 are optimally adjusted to accommodate the current manner in which a user can potentially interact with those user interface elements 210 (e.g., touchpad input if a peripheral keyboard is attached vs. touch-screen input if the peripheral keyboard is detached).

Here, operation of the touch-enabled computing device 100 remains intuitive in the sense that a user can still cause the operating system 102 to invoke particular functions by selecting the same user interface elements 210 which were present in the task bar 216 prior to the peripheral user input device 118 becoming unavailable. At the same time, the increased linear spacing between these user interface elements 210 improves an ability for individual ones of these user interface elements 210 to be selected via a touch screen (e.g., a capacitive sensing display). For example, since a curser element is no longer being rendered to indicate precisely which user interface element is being hovered over prior to a user clicking a button to complete the selection, the increased spacing reduces the probability of the user inadvertently selecting an icon that is adjacent to an intended or targeted icon.

Figure 2C:
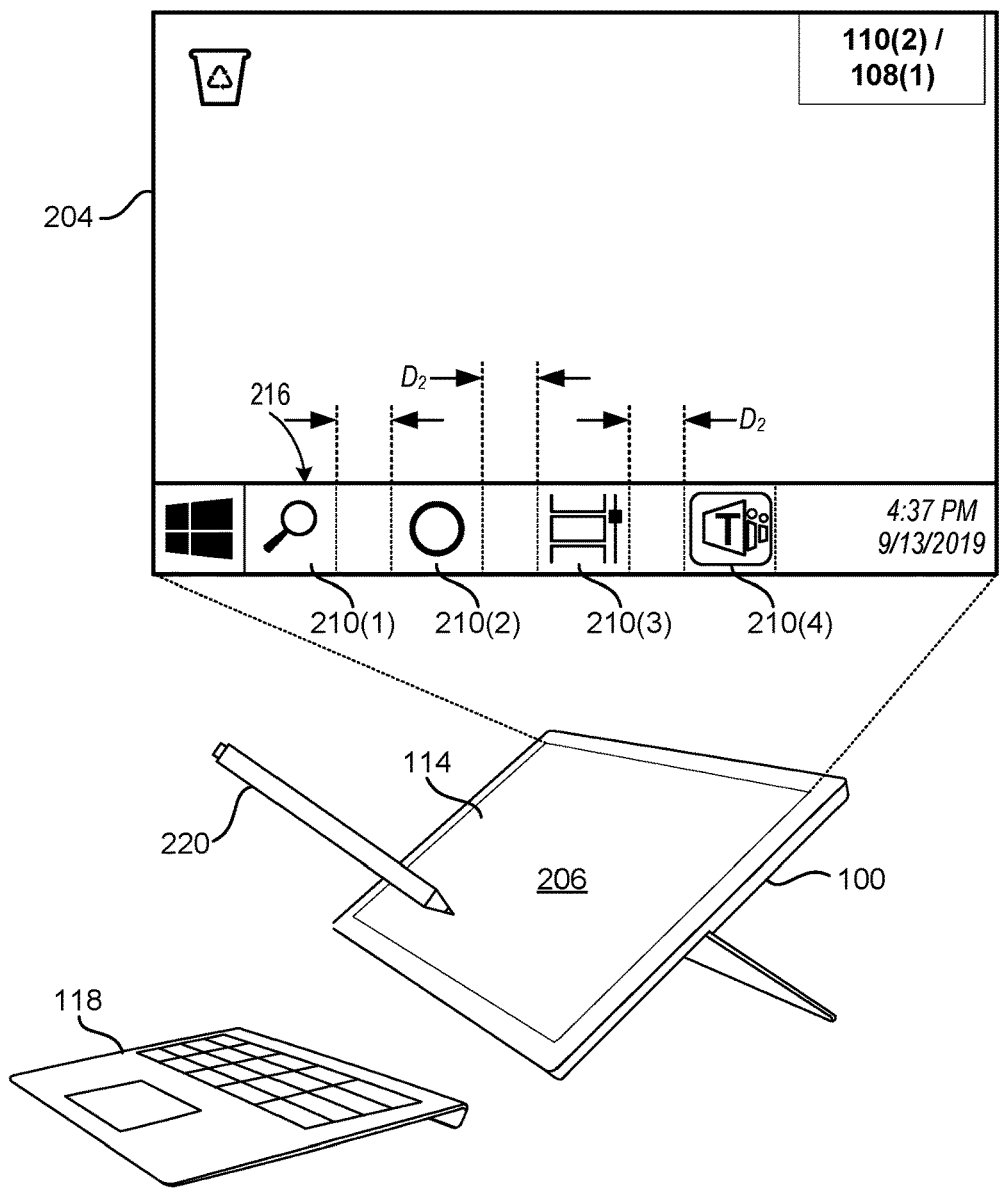
FIG. 2C illustrates an alternative scenario in which the touch-enabled computing device has transitioned to operation in the second posture of the first operating system mode.

FIG. 2C illustrates an alternative scenario in which the touch-enabled computing device 100 transitions to operation in the second posture 110(2) of the first mode 108(1). As illustrated in scenario C, the touch-enabled computing device 100 has performed the posture adjustment to the second posture 110(2) in response to detecting user input modality signals 126 that include a combination of the peripheral user input device 118 being currently disconnected from the touch-enabled computing device 100, one or more inputs from a stylus pen 220 via the touchscreen 114. Similar to scenario B, scenario C represents circumstances in which the user input modality signals 126 are indicative that the touchscreen 114 will be the currently preferred channel (e.g., mode) for providing user input.

Figure 2D:
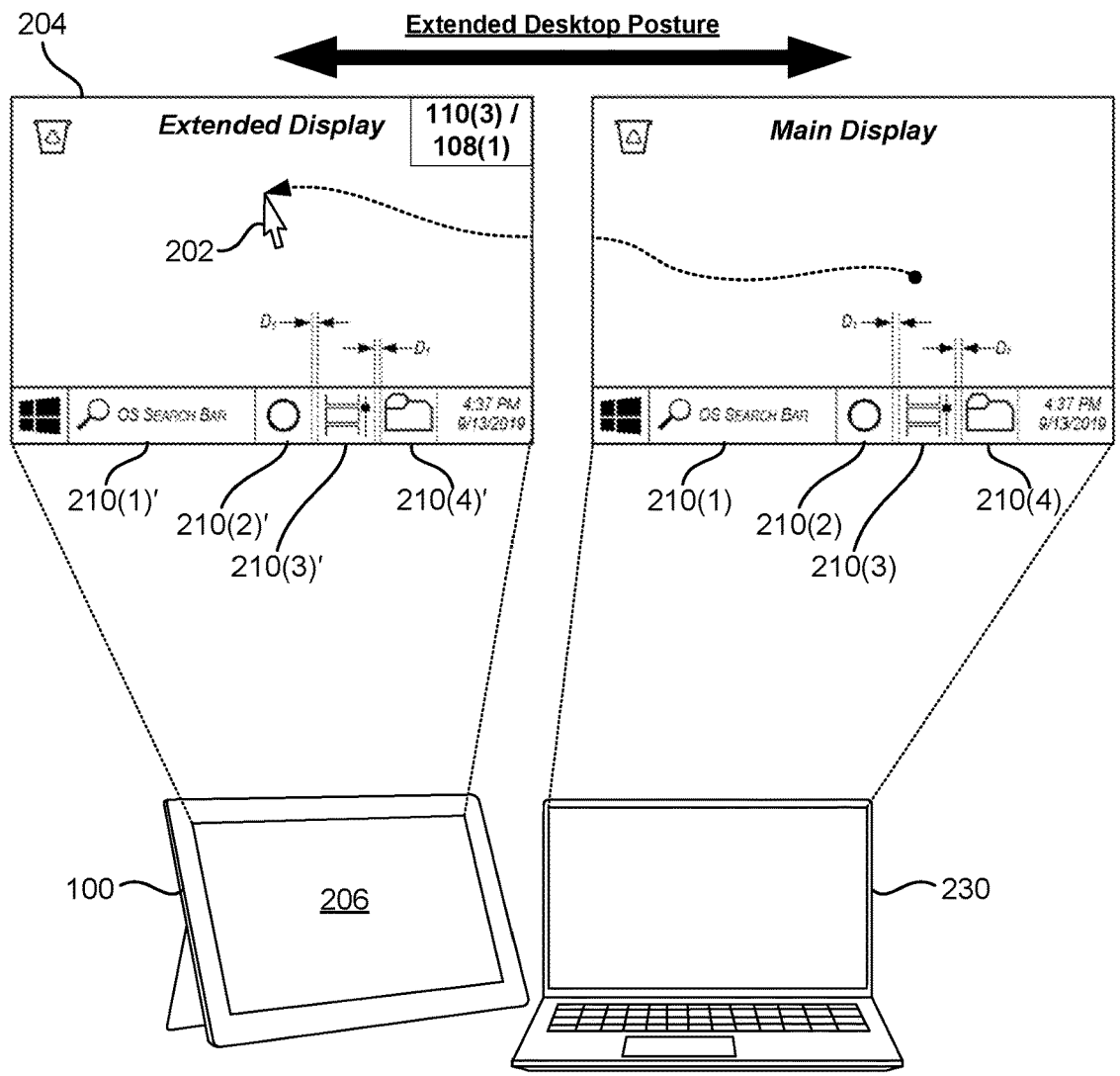
FIG. 2D illustrates a scenario in which the touch-enabled computing device has transitioned to operating in accordance with a third posture of the first operating system mode.

FIG. 2D illustrates a scenario in which the touch-enabled computing device 100 is operating in accordance with a third exemplary posture 110(3) of the first mode 108(1) (e.g., the "desktop" mode). Here, scenario C corresponds to the touch-enabled computing device 100 operating in an "Extended Desktop Posture" of the first mode 108(1) (e.g., the "desktop" mode). As illustrated in scenario D, the touch-enabled computing device 100 has detected user input modality signals 126 that include a combination of the accelerometer data indicating that the touch-enabled computing device 100 is resting on a surface and is at a physical location that is in close proximity to another computing device 230 that is operating in "desktop mode" and/or to which both keyboard and optical mouse (or touchpad) user inputs are available. In response to these user input modality signals 126, a posture adjustment is performed that includes: (i) determining a current operational state of the other computing device 230, and (ii) dynamically reproducing aspects of the current operational state based on user input that is being received via other computing device 230. For example, as illustrated, user interface elements 210 being rendered within a task bar of the other computing device 230 may be reproduced within the task bar of the touch-enabled computing device 100.

Exemplary user input modality signals 126 for triggering such a posture adjustment include, but are not limited to, accelerometer data indicating that the touch-enabled computing device 100 has been gently "tapped" against the other computing device 230 just prior to being rested adjacent to the other computing device 230 (e.g., the gentle tap may serve an a que that the user intends to pair the two devices), gyroscope data indicating that an orientation of the touch-enabled computing device 100 matches an orientation of the other computing device 230 (e.g., the respective display screen angles match and/or are within a threshold range of matching), etc. Here, the posture adjustment of the touch-enabled computing device 100 into the third posture 110(3) serves to compliment the use of the other computing device 230 by increasing the functionality of the other computing device 230 in some predefined manner. For example, aspects of the current operational state of the other computing device may be graphically reproduced so that the touch-enabled device duplicates or serves as an extension of the desktop of the other computing device. That is, the display area 204 of the device 100 may serve as an extended display area to a main display area of the other computing device 230. In this way, a user who is currently using a first device (e.g., a laptop computer 230) may seamlessly extend or duplicate the desktop thereof by tapping a second device (e.g., the touch-enabled computing device 100) against the first device and then positioning the second device adjacent thereto.

Figure 3:
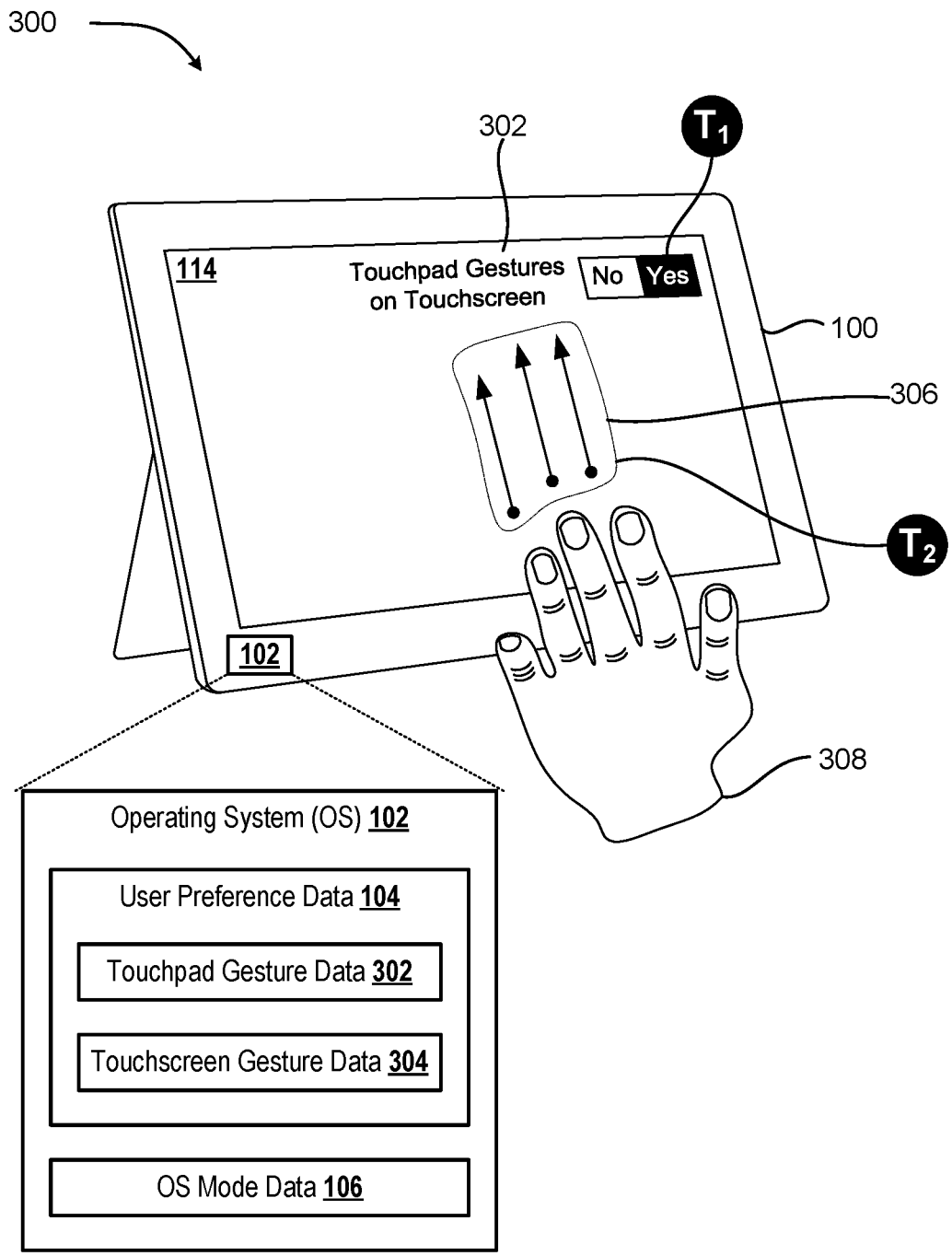
FIG. 3 illustrates an exemplary scenario in which a user preference is set within the user preference data of the operating system of the touch-enabled computing device to extend applicability of touchpad gestures to the touchscreen.

FIG. 3 illustrates an exemplary scenario 300 in which a user preference 302 is set within the user preference data 104 of the operating system 102 of the touch-enabled computing device 100 to extend applicability of touchpad gestures to the touchscreen 114. As illustrated in scenario 300, the user preference 302 is designed to prescribe whether or not a series of touchpad gestures that are defined within touchpad gesture data 302 are able to be provided to the touch-enabled computing device 100 via the touchscreen 114. For purposes of the present discussion, presume that the user preference 302 is toggled from "No" to "Yes" at time $T_1$ to extend applicability of the touchpad gestures to the touchscreen 114.

In some embodiments, the user preference data 104 includes both the touchpad gesture data 302 that defines the touchpad gestures and touchscreen gesture data 304 that defines a series of touchscreen gestures that by system default can be provided to the touch-enabled computing device 100 via the touchscreen 114. Exemplary touchpad gestures include, but are not limited to, a "show desktop" gesture that is performed by placing three fingers on the touchpad 120 of the peripheral user input device 118 and swiping these three fingers toward oneself, a "see all open windows" gesture 304 that is performed by placing three fingers on the touchpad 120 and swiping these three fingers away from oneself, an "open digital assistant" gesture that is performed by tapping three fingers on the touchpad, and so on. Exemplary touchscreen gestures include, but are not limited to, a "zoom in" gesture that is performed by placing two fingers on the touchscreen 114 at a point of interest and then spreading the fingers apart, a "close app" gesture that is performed by swiping a finger from the top of the touchscreen to the bottom of the touchscreen, and so on.

As illustrated, at time $T_2$ a user 308 performs the "see all windows" gesture 306 that is defined within the touchpad gesture data 304. Here, since the applicability of the touchpad gestures has been extended to the touchscreen 114 at time $T_1$, the touch-enabled computing device 100 will respond to the touchpad gesture 306 being performed on the touchscreen 114 just the same as if the touchpad gesture 306 were to be performed on the touchpad 120. Furthermore, if any touchscreen gesture that is defined within the touchscreen gesture data 304 corresponds to placing three fingers on the touchscreen 114 and swiping these three fingers away from oneself, the touch-enabled computing device 100 may opt to perform the action defined in association with the touchpad gesture 306 rather than another action associated with the touchscreen gesture based on the user preference that is set at time $T_1$.

Figure 4:
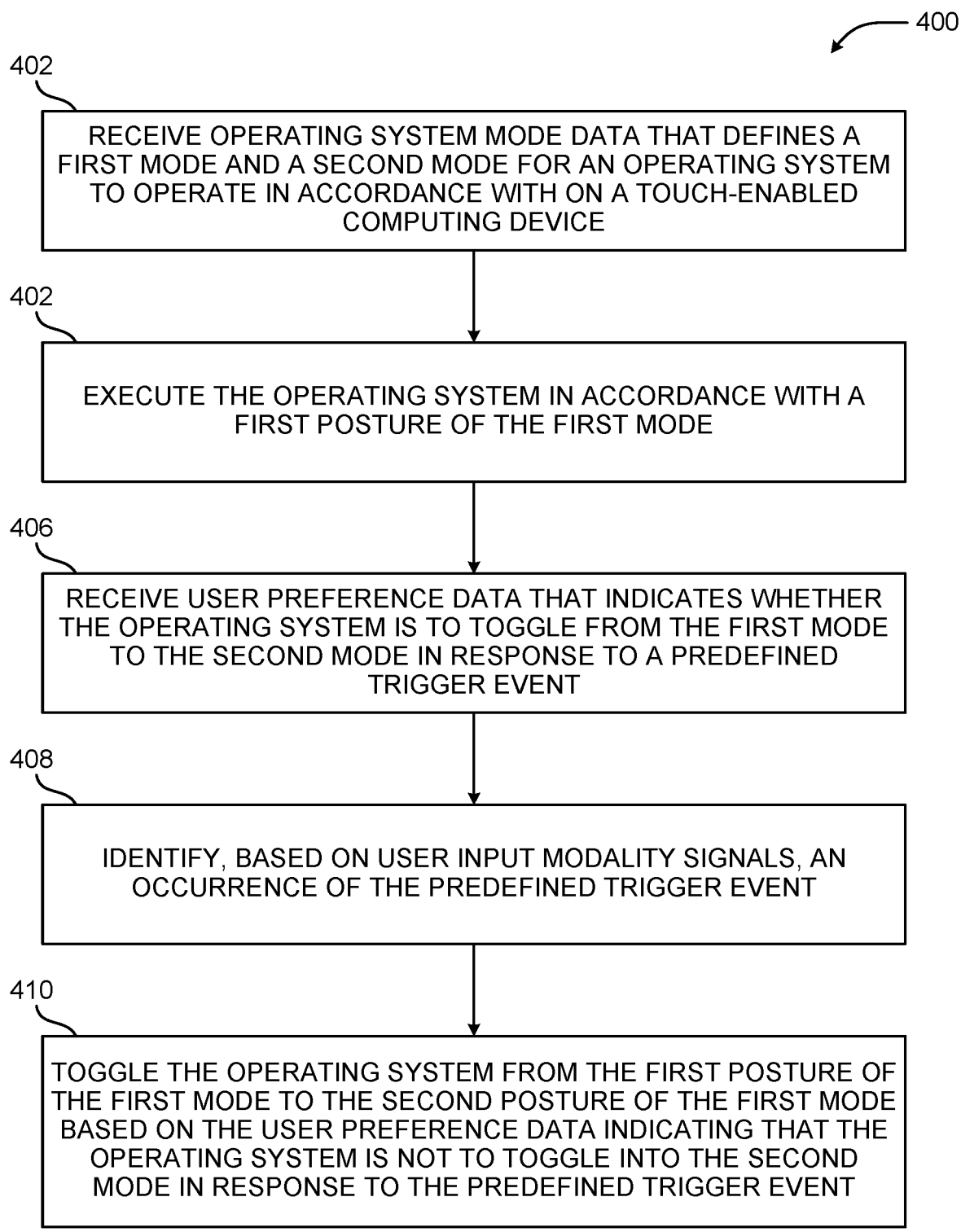
FIG. 4 is a flow diagram of an exemplary process for adjusting a posture of an operating system mode for a touch-enabled computing device based on combinations of user preferences and user input modality signals.

Turning now to FIG. 4, a flow diagram is shown for an exemplary process 400 for adjusting a posture of an operating system mode for a touch-enabled computing device based on combinations of user preferences and user input modality signals. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

At operation 402 of the routine 400, a touch-enabled computing device receives operating system mode data that defines a first mode and a second mode for an operating system to operate in accordance with. For example, as described above, the touch-enabled computing device may be configured to operating in a desktop mode and a tablet mode. Moreover, the operating system mode data may further define at least a first posture and a second posture within which the touch-enabled computing device can operate the first mode in accordance with.

At operation 404, the touch-enabled computing device executes the operating system in accordance with a first posture of the first mode. For example, while a peripheral user input device is coupled to the touch-enabled computing device, the operating system may operate in the first posture of the first computing mode.

At operation 406, the touch-enabled computing device receives user preference data that indicates whether the operating system is to toggle from the first mode to the second mode in response to a predefined trigger event. For example, as described in relation to FIG. 1, user input may be received that defines a user preference not to have the operating system toggle into the second mode (e.g., tablet mode) in response to the predefined trigger event.

At operation 408, the touch-enabled computing device monitors user input modality signals and, based thereon, identifies an occurrence of the predefined trigger event. For example, as described in relation to FIG. 2B, the touch-enabled computing device may determine that a peripheral user input device has been detached from the touch-enabled computing device. Additionally, or alternatively, the touch-enabled computing device may determine that accelerometer data is consistent with the device being held such that physical keyboard-based user inputs are unlikely.

At operation 410, the touch-enabled computing device causes the operating system to respond to the occurrence of the predefined trigger event by performing a posture adjustment of the first mode from the first posture to a second posture of the first mode, based on the user preference data indicating that the operating system is not to toggle from operating in accordance with the first mode to operating in accordance with the second mode in response to the predefined trigger event.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 5:
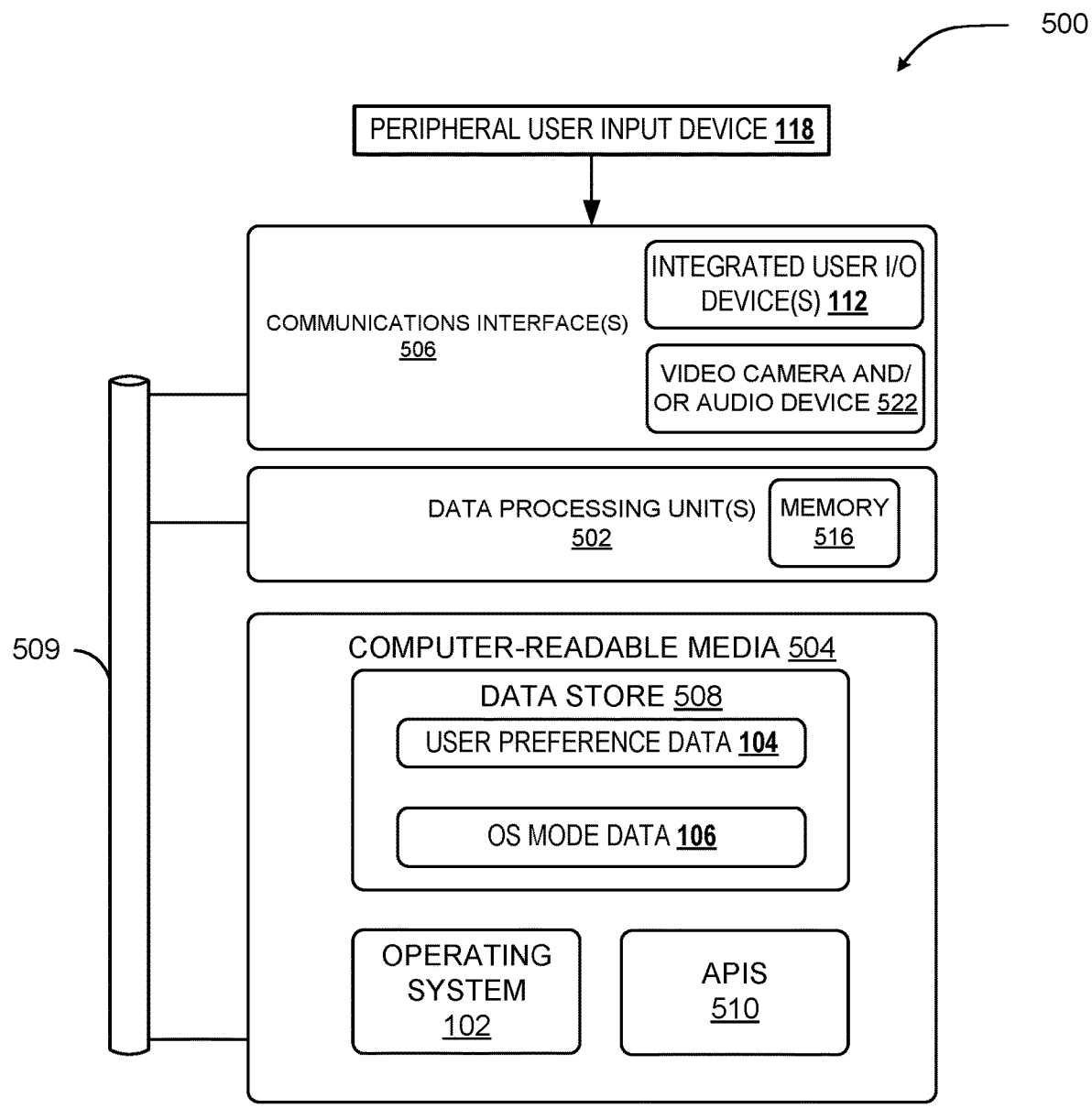
FIG. 5 illustrates a diagram that shows example components of an example device (also referred to herein as a "touch-enabled computing device") that is suitable for facilitating embodiments and implementations of the techniques described herein.

FIG. 5 illustrates a diagram that shows example components of an example device 500 (also referred to herein as a "computing device") configured to generate data for some of the user interfaces disclosed herein.

As illustrated, the device 500 includes one or more data processing unit(s) 502, computer-readable media 504, and communication interface(s) 506. The components of the device 500 are operatively connected, for example, via a bus 509, which may include one or more of a system bus, a data bus, an address bus, a PCI bus, a Mini-PCI bus, and any variety of local, peripheral, and/or independent buses.

As utilized herein, the data processing unit(s) 502 may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS SPs"), System-on-a-Chip Systems ("SOCs"), Complex Programmable Logic Devices ("CPLDs"), etc.

As utilized herein, the computer-readable media 504 may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 506 may represent, for example, network interface controllers ("NICs") or other types of transceiver devices to send and receive communications over a network. Furthermore, the communication interface(s) 506 may include one or more video cameras and/or audio devices 522 to enable generation of video feeds and/or still images, and so forth. Furthermore, the communication interface(s) 506 may include the Integrated User I/O Device(s) 112.

In the illustrated example, computer-readable media 504 includes a data store 508. In some examples, the data store 508 includes data storage such as a database, data warehouse, or other type of structured or unstructured data storage. In some examples, the data store 508 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example. The data store 508 may store data for the operations of processes, applications, components, and/or modules stored in computer-readable media 504 and/or executed by data processing unit(s) 502 and/or accelerator(s). For instance, in some examples, the data store 508 may store User Preference Data 104 (e.g., User Preference Data 104 as shown in FIG. 11), OS Mode data 106 (e.g., as also shown in FIG. 1), and/or other data.

Alternately, some or all of the above-referenced data can be stored on separate memories 516 on board one or more data processing unit(s) 502 such as a memory on board a CPU-type processor, a GPU-type processor, an FPGA-type accelerator, a DSP-type accelerator, and/or another accelerator. In this example, the computer-readable media 504 also includes an operating system 518 and application programming interface(s) 510 (APIs) configured to expose the functionality and the data of the device 500 to other devices.

It should also be appreciated that many variations and modifications may be made to the above-described examples, the elements of which are to be understood as being among other acceptable examples. All such modifications and variations are intended to be included herein within the scope of this disclosure and protected by the following claims.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A touch-enabled computing device, comprising:
a processor; and
memory in communication with the processor, the memory having computer-readable instructions stored thereupon that, when executed by the processor, cause the processor to:
access operating system mode data that defines at least a first mode for an operating system and a second mode for the operating system, the first mode for the operating system configured to execute according to a first posture and a second posture;
execute the operating system in the first mode according to the first posture;
receive an indication that the operating system is not to toggle from executing in the first mode to executing in the second mode based on a predefined trigger event;
identify, based on user input modality signals, an occurrence of the predefined trigger event; and
cause, based on the indication and the occurrence of the predefined trigger event, the operating system to switch from executing in the first mode according to the first posture to executing in the first mode according to the second posture.

2. The touch-enabled computing device of claim 1, wherein:
the first mode corresponds to a plurality of user interface elements being rendered within a task bar along a peripheral edge of a display area; and
switching from executing in the first mode according to the first posture to executing in the first mode according to the second posture includes modifying a characteristic with which the plurality of user interface elements are being rendered within the task bar.

3. The touch-enabled computing device of claim 2, wherein:
the first posture corresponds to the plurality of user interface elements being rendered at a first linear spacing within the task bar; and
modifying the characteristic includes causing the plurality of user interface elements to be rendered at a second linear spacing, that is greater than the first linear spacing, within the task bar.

4. The touch-enabled computing device of claim 2, wherein modifying the characteristic includes:
reducing a size of a first user interface element of the plurality of user interface elements; and
increasing a linear spacing between a second user interface element, of the plurality of user interface elements, and a third user interface element of the plurality of user interface elements.

5. The touch-enabled computing device of claim 1, wherein identifying the occurrence of the predefined trigger event includes determining that a peripheral user input device has been detached from the touch-enabled computing device.

6. The touch-enabled computing device of claim 1, wherein identifying the occurrence of the predefined trigger event includes determining that touchscreen usage exceeds a threshold usage level.

7. The touch-enabled computing device of claim 1, wherein identifying the occurrence of the predefined trigger event includes detecting a user input to a touchscreen that is provided by a stylus pen.

8. The touch-enabled computing device of claim 1, wherein switching from executing in the first mode according to the first posture to executing in the first mode according to the second posture includes both:
increasing a linear spacing between a plurality of user interface elements within a task bar along a peripheral edge of a display area; and
ceasing to render a cursor element that is rendered while the operating system is executing in the first mode according to the first posture.

9. The touch-enabled computing device of claim 1, wherein each of the first posture and the second posture includes displaying a plurality of operating system function icons within a task bar along a peripheral edge of a display area.

10. The touch-enabled computing device of claim 9, wherein each of the first posture and the second posture includes displaying an application icon within the task bar along the peripheral edge of the display area.

11. A computer-implemented method, comprising:
accessing operating system mode data that defines at least a first mode for an operating system and a second mode for the operating system, the first mode for the operating system configured to execute according to a first posture and a second posture;
executing the operating system in the first mode according to the first posture;
receiving an indication that the operating system is not to toggle from executing in the first mode to executing in the second mode based on a predefined trigger event;
identifying, based on user input modality signals, an occurrence of the predefined trigger event; and
causing, based on the indication and the occurrence of the predefined trigger event, the operating system to switch from executing in the first mode according to the first posture to executing in the first mode according to the second posture.

12. The computer-implemented method of claim 11, wherein:
the first mode renders a plurality of user interface elements within a task bar along a peripheral edge of a display area; and
the second mode omits rendering of the task bar or omits at least one of the plurality of user interface elements from being rendered within the task bar.

13. The computer-implemented method of claim 12, wherein switching from executing in the first mode according to the first posture to executing in the first mode according to the second posture includes modifying a characteristic with which the plurality of user interface elements are rendered within the task bar.

14. The computer-implemented method of claim 11, wherein switching from executing in the first mode according to the first posture to executing in the first mode according to the second posture includes increasing a linear spacing between a plurality of user interface elements within a task bar along a peripheral edge of a display area.

15. The computer-implemented method of claim 11, wherein the predefined trigger event corresponds to a peripheral user input device being physically detached from a touch-enabled computing device on which the operating system is executing.

16. The computer-implemented method of claim 11, wherein the predefined trigger event corresponds to a touchscreen usage exceeding a threshold usage level.

17. A touch-enabled computing device, comprising:
a processor; and
memory in communication with the processor, the memory having computer-readable instructions stored thereupon that, when executed by the processor, cause the processor to:
receive operating system mode data that defines:
a first posture for a first operating mode of an operating system;
a second posture for the first operating mode of the operating system; and
a second operating mode of the operating system;
execute the operating system in accordance with the first posture for the first operating mode;
access an indication that the operating system is not to toggle from the first operating mode to the second operating mode based on a predefined trigger event;
identify, based on user input modality signals, an occurrence of the predefined trigger event; and
cause, based on the indication and the occurrence of the predefined trigger event, the operating system to switch from executing in accordance with the first posture for the first operating mode to executing in accordance with the second posture for the first operating mode.

18. The touch-enabled computing device of claim 17, wherein each of the first posture for the first operating mode and the second posture for the first operating mode includes displaying an application icon within a task bar along a peripheral edge of a display area.

19. The touch-enabled computing device of claim 17, wherein the predefined trigger event corresponds to at least one of: a peripheral user input device being physically detached from the touch-enabled computing device or a touchscreen usage exceeding a threshold usage level.

20. The touch-enabled computing device of claim 17, wherein:
the predefined trigger event corresponds to a determination that the touch-enabled computing device is proximate to another computing device; and
the second posture for the first operating mode corresponds to an extended desktop posture in which a display area of a touchscreen serves as an extended display to another display area of the other computing device.

* * * * *